United States Patent
Sugane (10) Patent No.: US 7,058,393 B2
(45) Date of Patent: Jun. 6, 2006

(54) TRANSCEIVER AND ITS TRANSMITTING METHOD AND RECEIVING METHOD

(75) Inventor: Koji Sugane, Tokyo (JP)

(73) Assignee: NEC Corporation, Tokyo (JP)

( * ) Notice: Subject to any disclaimer, the term of this patent is extended or adjusted under 35 U.S.C. 154(b) by 583 days.

(21) Appl. No.: 10/252,670

(22) Filed: Sep. 24, 2002

(65) Prior Publication Data

US 2003/0064715 A1    Apr. 3, 2003

(30) Foreign Application Priority Data

Oct. 1, 2001    (JP)    ............................... 2001-305444

(51) Int. Cl.
*H04M 3/42*    (2006.01)
*H04Q 7/20*    (2006.01)
*G06F 15/16*    (2006.01)

(52) U.S. Cl. ................... 455/414.1; 455/416; 455/466; 709/206; 709/219

(58) Field of Classification Search ............... 455/66.1, 455/73, 414.1–414.4, 563, 566; 709/217–219
See application file for complete search history.

(56) References Cited

U.S. PATENT DOCUMENTS

| | | | | |
|---|---|---|---|---|
| 5,590,178 A | * | 12/1996 | Murakami et al. | ....... 379/93.18 |
| 6,112,084 A | * | 8/2000 | Sicher et al. | ................ 370/337 |
| 6,519,471 B1 | * | 2/2003 | Yamaguchi | .................. 455/517 |
| 2001/0016874 A1 | * | 8/2001 | Ono et al. | ................... 709/206 |
| 2001/0018703 A1 | * | 8/2001 | Miyazawa et al. | .......... 709/203 |
| 2004/0162060 A1 | * | 8/2004 | Hara et al. | ............... 455/414.1 |

FOREIGN PATENT DOCUMENTS

| | | | |
|---|---|---|---|
| EP | 1 128 647 A2 | | 8/2001 |
| EP | 1 022 668 A3 | | 4/2002 |
| EP | 1 338 972 A1 | | 8/2003 |
| GB | 2 371 948 A | | 8/2002 |
| GB | 2 380 093 A | | 3/2003 |
| JP | 11-146083 A | | 5/1999 |
| JP | 11298635 A | * | 10/1999 |
| JP | 2001-34548 A | | 2/2001 |
| JP | 2001034548 A | * | 2/2001 |
| WO | WO 99/67726 A1 | | 12/1999 |
| WO | WO 00/04690 A1 | | 1/2000 |
| WO | WO 01/006397 A3 | | 1/2001 |
| WO | WO 02/001828 A1 | | 1/2002 |

* cited by examiner

*Primary Examiner*—Ovidio Escalante
*Assistant Examiner*—Samir S. Karovalia
(74) *Attorney, Agent, or Firm*—Sughrue Mion, PLLC (57) ABSTRACT

A transceiver can simultaneously execute transmission of both a voice signal and an email. A memory in the transceiver previously stores a phone number, an email address, and a URL which are associated with each other. A caller can automatically transmit the email having the associated URL in body text to the associated email address, upon calling the phone number in the memory from the transceiver. The transceiver displays the sent and received URL on its display. Consequently, the caller and a callee can easily access the same URL during communication.

20 Claims, 7 Drawing Sheets

TRANSCEIVER AND ITS TRANSMITTING METHOD AND RECEIVING METHOD

BACKGROUND OF THE INVENTION

1. Field of the Invention

The present invention relates to a transceiver of a phone and a transmitting method and a receiving method of the phone. More particularly, the present invention relates to a transceiver accessible to the Internet, and a transmitting method and a receiving method of the transceiver.

2. Description of the Related Prior Art

Recently, some phone communication companies provide services for mobile phone's access to the Internet. The mobile phone is provided with an HTML (Hyper Text Markup Language) browser for text and, therefore, can obtain and display character information on an email or a homepage from a network. When a phone number or an Internet address (URL: Uniform Resource Locator) is described on the email displayed on the mobile phone, an operator of the mobile phone clicks the phone number or the URL, thereby calling the phone number or jumping to a site of the URL. As a result, a caller and a callee can communicate with each other while viewing the same homepage.

However, the above-mentioned mobile phone requires the transmission of a necessary URL by voice during communication or the transmission of the URL by the email or the like at another time so as to view the same homepage by the caller and the callee. The caller cannot easily communicate the URL to the callee without fail during the communication.

Japanese Unexamined Patent Application Publication No. 11-146083 discloses a communication system including a server having a table containing a phone number and a URL of a homepage corresponding thereto. On the communication system, a caller or a callee accesses the table in the server during communication by using a personal computer, thereby displaying a homepage of the caller or callee on the caller's or the callee's own personal computer. However, an accessible URL is restricted on the communication system and cannot easily be changed. Further, the caller or the callee must perform the operation for access to the server during the communication.

SUMMARY OF THE INVENTION

According to a first aspect of the present invention, a transceiver for enabling voice communication and network access comprises: a transmitting and receiving unit; a data input unit; a display unit; a memory for storing a phone number, an email address, and a URL; a data transmitting unit for transmitting a voice signal to the phone number in the memory via the transmitting and receiving unit and an email to the email address corresponding to the phone number, which includes the URL associated with the phone number; a data receiving unit for receiving the voice signal; and a display control unit for displaying the URL to the display unit.

According to a second aspect of the present invention, a transceiver for enabling voice communication and access to a network comprises: a transmitting and receiving unit; a data input unit; a display unit; a data receiving unit for receiving a voice signal and an email; and a display control unit for displaying a URL included in the received email on the display unit.

According to a third aspect of the present invention, a transceiver for enabling voice communication and access to a network comprises: a transmitting and receiving unit; a data input unit; a display unit; a memory for storing a phone number, an email address, and a URL; a data transmitting unit for transmitting a voice signal to the phone number in the memory via the transmitting and receiving unit and an email to the email address corresponding to the phone number, which includes the URL associated with the phone number; a data receiving unit for receiving the voice signal and the email; and a display control unit for displaying the URL included in the transmitted or received email on the display unit.

In the transceiver according to the first or third aspects of the present invention, the memory can store the phone number, the email address, and the URL associated therewith. Further, the memory can store a plurality of URLs associated with a phone number, and a caller selects at least one of the plurality of URLS. The transceiver further can comprise an email forming unit for forming the email including the URL. The memory can store a flag indicating whether or not the email is sent to the email address when a caller sends the voice signal to the phone number. The transceiver can further comprise a data input control unit for storing the phone number, the email address, and the URL that are inputted by the data input unit, associated therewith. In the transceiver, the display control unit can display an icon corresponding to the URL. In the transceiver according to the first, second, or third aspect of the present invention, at least the data transmitting unit, the data receiving unit and the display control unit can be formed in a CPU. The transceiver can be any of a mobile terminal device, a personal computer, and a cellular phone.

In the present invention, a transmitting method comprises the steps of: (a) calling a predetermined phone number stored in a memory; (b) forming an email to an email address corresponding to the predetermined phone number, which includes a URL associated with the predetermined phone number; (c) transmitting the email to the email address; and (d) displaying at least one or more URLs and icons corresponding thereto. In the transmitting method, the memory can store the phone number, the email address, and the URL that are associated with each other. Further, the memory can store a plurality of URL associated to a phone number and a caller selects at least one of the plurality of URLS. The calling step and the steps of forming and transmitting the email can be simultaneously executed.

In the present invention, a receiving method comprises the steps of: (a) receiving a call from a caller; (b) receiving an email from the caller upon receiving the call; (c) determining whether or not a URL is included in the email; and (d) displaying the URL included in the email on a display unit.

In the present invention, one program for enabling processing by a computer comprises the processing for: calling a phone number designated by a caller among phone numbers stored in a memory; forming an email to an email address corresponding to the designated phone number which includes a URL associated with the phone number; transmitting the email to the email address; and displaying at least one or more the transmitted URLs and icons corresponding thereto. In the program, the memory can store the phone number, the email address, and the URL that are associated with each other. Further, the program can comprise the processing for determining whether or not the email is transmitted to the email address based on a flag stored in the memory.

In the present invention, another program for enabling processing by a computer comprises the processing for: receiving an email; determining whether or not a URL is included in the email; and displaying the URL on a display unit when determining that the URL is included in the email.

In the present invention, further another program for enabling processing by a computer comprises the processing for: receiving an email; determining whether or not a URL is included in the email; and displaying a predetermined icon corresponding the URL when determining that the URL is included in the email.

In the present invention, still another program for enabling processing by a computer comprises the processing for: storing in a memory, a phone number inputted from an input unit; associating the email address inputted from the input unit with the phone number and storing the email address in the memory; and further associating a URL inputted from the input unit with the email address or the phone number and storing the URL in the memory. The program can further comprise the processing for storing a flag indicating whether or not the email is transmitted to the email address upon communication with the phone number.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
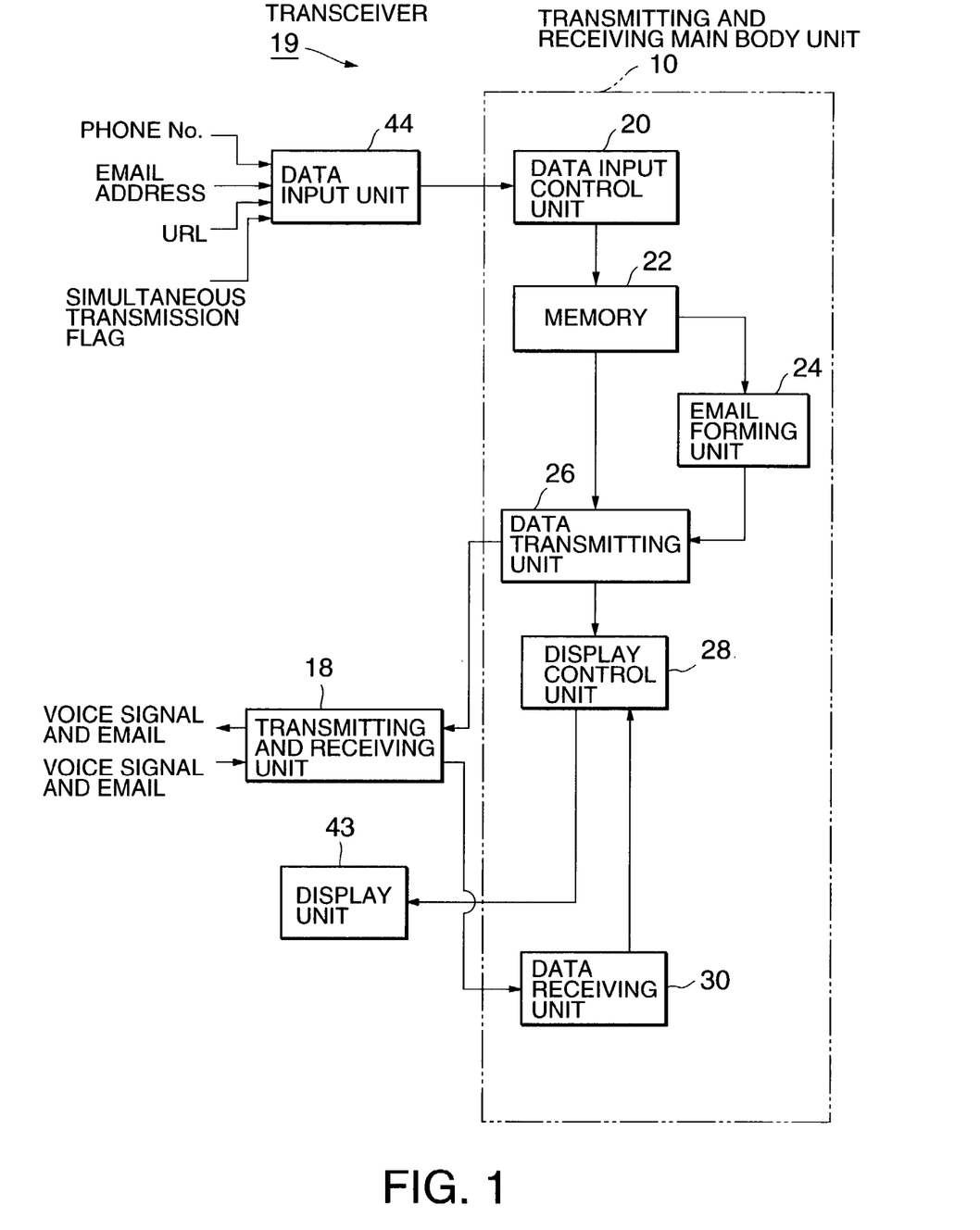
FIG. 1 is a block diagram showing a transceiver according to a first embodiment of the present invention.

FIG. 1 is a block diagram of a transceiver according to a first embodiment of the present invention. Referring to FIG. 1, a transceiver 19 comprises a transceiver main body unit 10, a data input unit 44, a transmitting and receiving unit 18, and a display unit 43. A caller inputs from the data input unit 44, a phone number, an email address, a URL, a simultaneous transmission flag, and the like. The transmitting and receiving unit 18 receives a voice signal and an email from the transceiver main body unit 10, transmits the received voice signal and email to a relay station or a network, and receives the voice signal or the email from the caller. The display unit 43 displays data that is transmitted and received.

The transceiver main body unit 10 comprises a data input control unit 20, a memory 22, an email forming unit 24, a data transmitting unit 26, and a display control unit 28. The data input control unit 20 receives from the data input unit 44, the phone number, an email address corresponding to the phone number, and a URL corresponding thereto, which are associated with the received phone number, email address, and URL, and stores them in the memory 22. The email forming unit 24 forms the email including the URL stored in the memory 22 in body text. The data transmitting unit 26 transmits the voice signal to the phone number stored in the memory 22 via the transmitting and receiving unit 18. Simultaneously, the data transmitting unit 26 transmits via the transmitting and receiving unit 18 the email formed by the email forming unit 24 to the email address stored in the memory 22 in association with the phone number. The display control unit 28 displays the URL included in the email transmitted by the data transmitting unit 26 on the display unit 43.

Further, the transceiver main body unit 10 further comprises a data receiving unit 30. The data receiving unit 30 can receive the voice signal and the email including the URL via the transmitting and receiving unit 18. The data receiving unit 30 receives the email and then the display control unit 28 displays the URL included in the email on the display unit 43.

Upon a call of the caller, the caller selects a predetermined phone number in the memory 22, or inputs the phone number stored in the memory 22 from the data input unit 44. When the memory 22 stores the email address and the URL associated with the phone number and a simultaneous transmission flag in the memory 22 is ON, the email forming unit 24 forms the email having the URL in body text. The data transmitting unit 26 transmits the voice signal to the selected or inputted phone number via the transmitting and receiving unit 18 and simultaneously transmits the email including the URL to the email address. Subsequently, the display control unit 28 displays the transmitted URL on the display unit 43. The caller clicks the displayed URL, thereby viewing the homepage of the URL.

Upon call reception of a callee, the data receiving unit 30 receives the voice signal via the transmitting and receiving unit 18 and simultaneously receives the email containing the URL. When the email is received, the display control unit 28 displays the URL included in the email on the display unit 43. The callee clicks the displayed URL, thereby viewing the same homepage as that of a caller.

The caller previously stores the phone number, the email address, and the URL in the memory 22 of the his own transceiver 19 in association therewith and thus can automatically transmit a predetermined URL to the callee only by normal transmitting call operation. The callee can display the URL transmitted by the caller on the display unit 43 only by normal call receiving operation. Therefore, when the caller desires to communicate with the callee while viewing the same homepage as that of the callee, the caller can easily transmit the URL to the callee.

When the memory 22 stores the single URL in association with an arbitrary phone number, the email including the URL in the body text is automatically formed and transmitted. However, the memory 22 can store a plurality of URLs associated with the single phone number. In this case, the caller selects the single or a plurality of URLs. The above-mentioned transceiver 19 is, for example, a cellular phone, a mobile terminal device, a PDA (Personal Digital Assistant), a personal computer with a communication function, or the like. The memory 22 can store the simultaneous transmission flag indicating whether or not the email is transmitted to the associated email address. A user of the transceiver 19 can simultaneously input the phone number and the simultaneous transmission flag from the data input unit 44.

Figure 2:
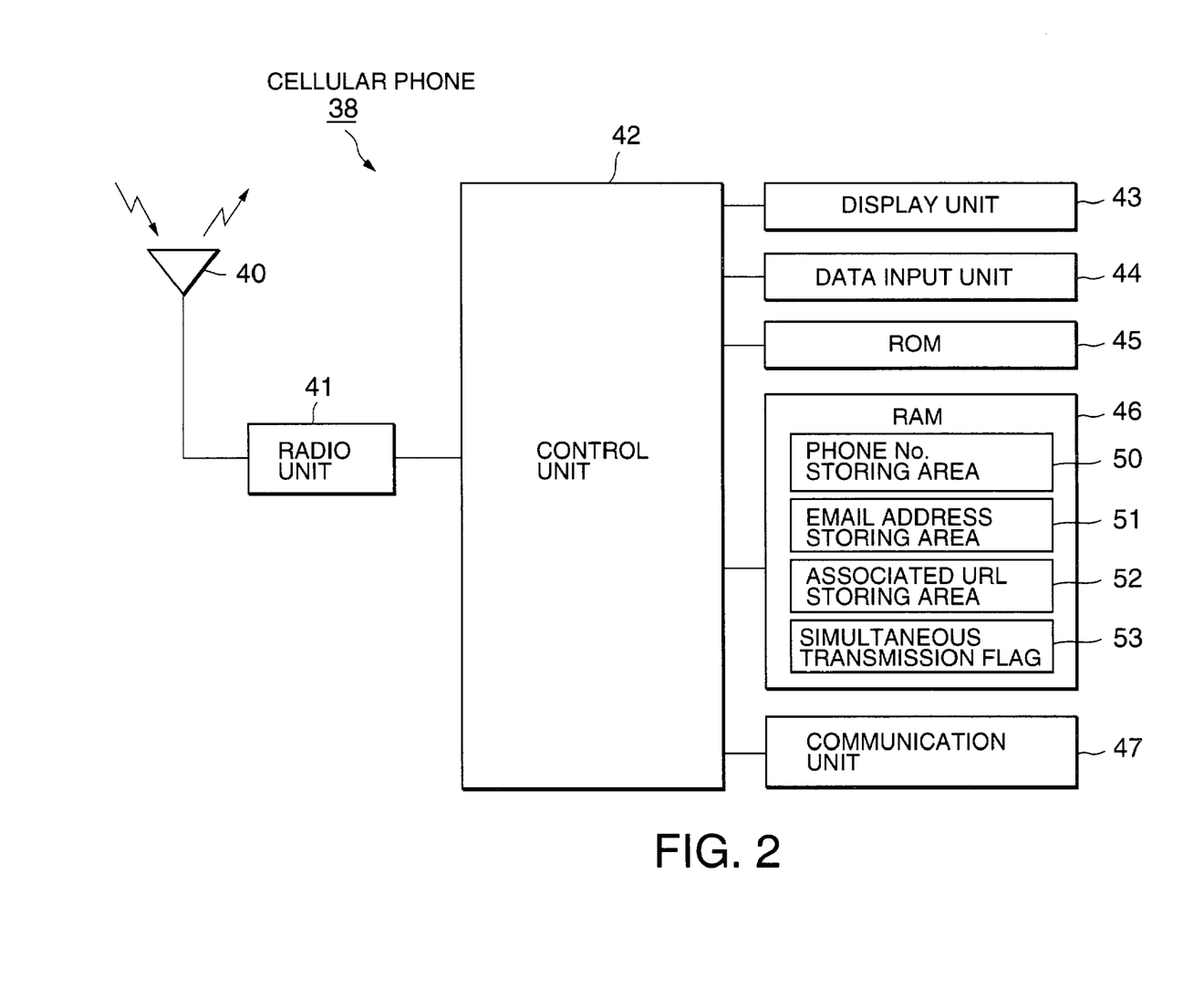
FIG. 2 is a block diagram showing a transceiver which is applied to a cellular phone according to a second embodiment of the present invention.
Figure 3:
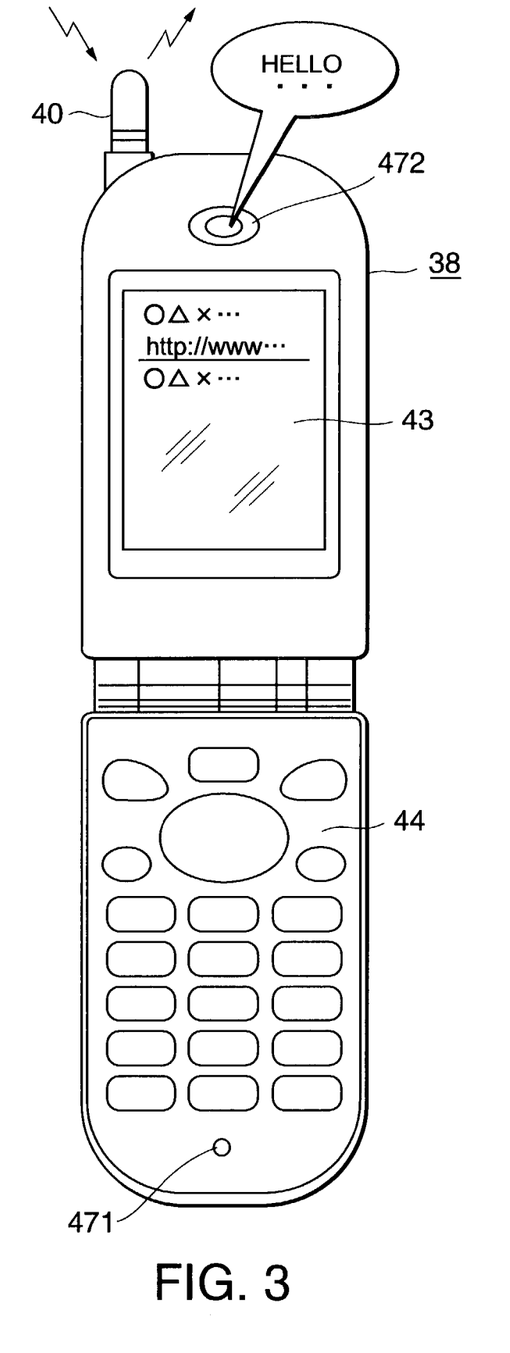
FIG. 3 is an external view showing the transceiver in FIG. 2 according to the second embodiment of the present invention.

FIG. 2 is a block diagram showing a transceiver that is applied to the cellular phone according to a second embodiment of the present invention. FIG. 3 is an external view of the cellular phone in FIG. 2. A cellular phone 38 comprises a radio antenna 40, a radio unit 41, a control unit 42, a display unit 43, a data input unit 44, a ROM 45, a RAM 46, and a communication unit 47. The radio antenna 40, the radio unit 41, and the communication unit 47 correspond to the transmitting and receiving unit 18 shown in FIG. 1. The control unit 42 corresponds to the transceiver main body unit 10 shown in FIG. 1. In some cases, the control unit 42, the ROM 45, and the RAM 46 correspond to the transceiver main body unit 10. The RAM 46 has a phone number storing area 50, an email address storing area 51, an associated URL storing area 52, and a simultaneous transmission flag 53. Further, the display unit 43 in FIG. 2 corresponds to the display unit 43 in FIG. 1, and the data input unit 44 in FIG. 2 corresponds to the data input unit 44 in FIG. 1.

The radio unit 41 comprises a radio transmitting and receiving circuit. The control unit 42 classifies the data received via the radio antenna 40 by the radio unit 41 every type of the data, and stores the classified data in the RAM 46. The control unit 42 displays the data content on the display unit 43. When reception data and transmission data are voice data, the communication can be performed via the communication unit 47 (corresponding to a microphone 471 and a speaker 472 shown in FIG. 3). The data input unit 44 is, for example, a keypad. The caller can input 0 to 9 numbers, alphabet, various instructions, and the like, from the data input unit 44. The caller and the callee can control displayed content on the display unit 43 by the data input unit 44. The control unit 42 transmits the phone number inputted via the data input unit 44 or the phone number stored in the RAM 46, as the voice data, via the radio unit 41. Thus, the voice communication with the callee can be performed via the communication unit 47. The control unit 42 automatically forms the email including the associated URL in accordance with data manually inputted by the caller or a program in the ROM 45. Further, the control unit 42 can transmit the email via the radio unit 41. The display unit 43 can display a communication state. The caller can use the phone number stored in the phone number storing area 50 of the RAM 46 upon voice call. When the caller inputs email data via the data input unit 44, the display unit 43 can display the input result.

Upon phone call, the caller first inputs a predetermined phone number from the data input unit 44 or inputs the phone number stored in the RAM 46 after reading the stored phone number. The display unit 43 displays the inputted phone number. When the caller calls the phone number via the data input unit 44, the control unit 42 calls the phone number via the radio unit 41 and the radio antenna 40. The communication is established and then the caller can perform the transmission and the reception via the communication unit 47. The caller performs predetermined input operation to the data input unit 44 and the display unit 43 can display the email address stored in the RAM 46. The caller performs the email body text forming operation and transmission operation via the data input unit 44. Then, the control unit 42 receives the email address and the body text of the email, and sends them to the radio unit 41 and the radio antenna 40. The display unit 43 displays the URL included in the email. When the cellular phone 38 of the callee receives the email, the control unit 42 stores the email in the RAM 46 and simultaneously displays the URL included in the email on the display unit 43.

The RAM 46 stores the email address and the URL associated with the phone number. The RAM 46 can store the simultaneous transmission flag 53 associated with the phone number. The simultaneous transmission flag 53 is a flag indicating whether or not the email is simultaneously transmitted upon phone call, and can be inputted from the data input unto 44 by the caller. The caller can adjust the cellular phone 38 so that the control unit 42 automatically forms and transmits the email including the associated URL to the email address associated with the transmitted phone number in accordance with the program in the ROM 45.

As mentioned above, the control unit 42 has functions of the data input control unit 20, the memory 22, the email forming unit 24, the data transmitting unit 26, the display control unit 28, and the data receiving unit 30 which are shown in FIG. 1. These functions are executed by various programs stored in, e.g., the ROM 45.

The RAM 46 can store a plurality of URLs associated with the single phone number. The caller can select the single or a plurality of URLs to be transmitted by the email upon phone call from the data input unit 44.

Figure 4:
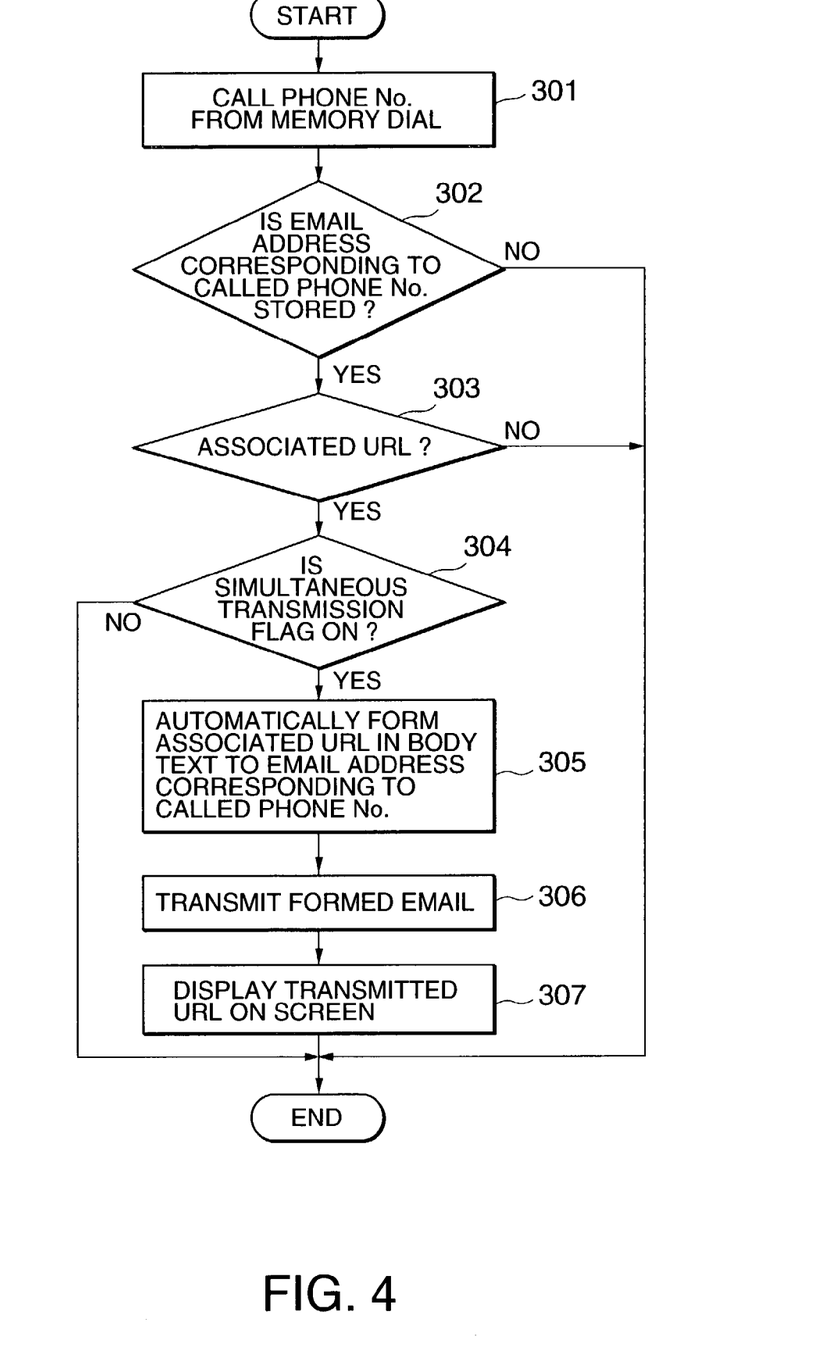
FIG. 4 is a flowchart of a transmitting method as an example of the present invention.

FIG. 4 is a flowchart showing transmission processing in the cellular phone 38 as an example. First, the caller calls the phone number from memory dial (step 301). The memory dial has phone numbers which are stored in the phone number storing area 50 in the RAM 46. The control unit 42 checks to see if the email address corresponding to the called phone number is stored in the email address storing area 51 (step 302). If the email address is not stored, only the phone call is continued. If the email address is stored, it is checked to see if the URL is stored in the associated URL storing area 52 (step 303). If the URL is not stored in the associated URL storing area 52, only the phone call is continued. If the URL is stored in the associated URL storing area 52, the simultaneous transmission flag 53 is checked (step 304). If it is checked that the simultaneous transmission flag 53 is OFF, that is, the simultaneous transmission is NO, only the call is continued. If it is checked that the simultaneous transmission is YES (that is, the simultaneous transmission flag 53 is ON), the email forming unit 24 automatically forms the email for sending a notification of the associated URL to the callee (step 305). The program in the ROM 45 forms the email to the email address in the email address storing area 51, which includes the URL in the body text in the associated URL storing area 52. After forming the email, the data transmitting unit 26 transmits the email (step 306). After transmitting the email, the display control unit 28 displays the sent associated URL on the display unit 43, thereby enabling the access to the URL (step 307). As a consequence of the above-mentioned processing, the caller can easily send a notification of the URL to the callee only by the phone call.

Figure 5:
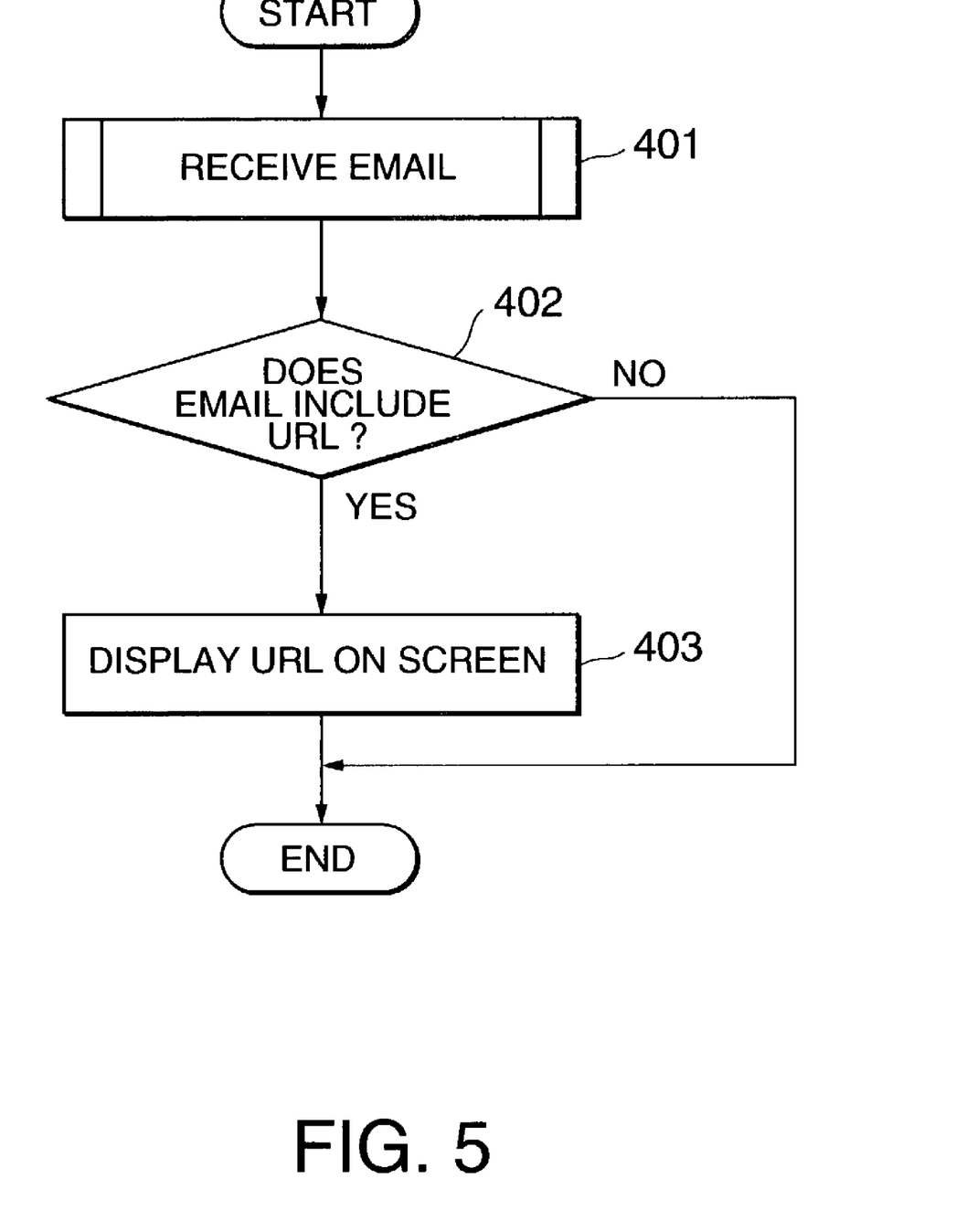
FIG. 5 is a flowchart of a receiving method as an example of the present invention.

FIG. 5 is a flowchart of reception processing in the cellular phone 38 as an example. First, the data receiving unit 30 receives the voice signal and the email via the transmitting and receiving unit 18 (step 401). The data receiving unit 30 checks to see if the body text of the received email includes the URL (step 402). If the body text of the email includes the URL, the display control unit 28 displays the URL on the display unit 43 so that the callee can access the URL (step 403). Therefore, the callee can view the associated URL which is simultaneously transmitted upon phone call without another operation.

Figure 6:
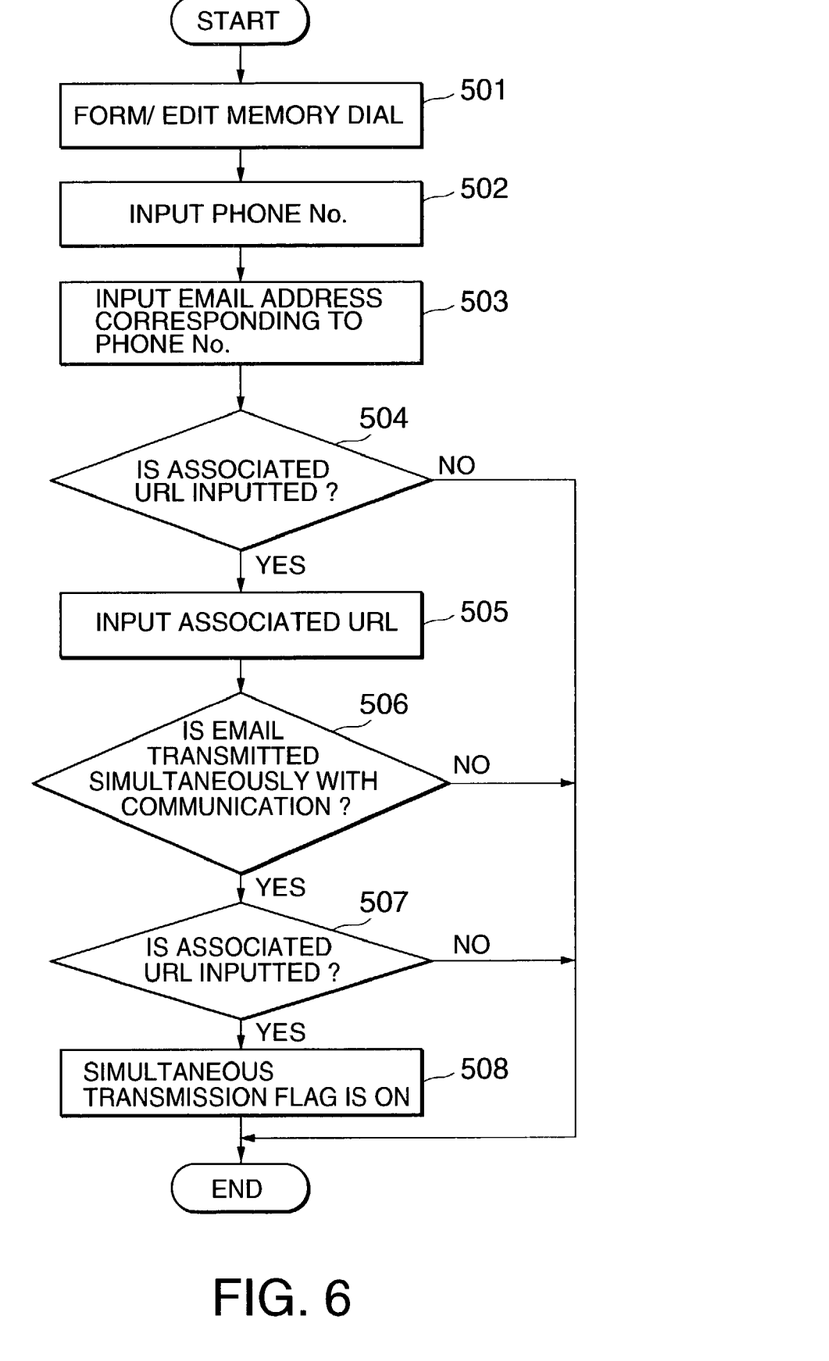
FIG. 6 is a flowchart showing steps of inputting data to the transceiver of the present invention.

FIG. 6 is a flowchart of processing in the associated URL storing area 52 and processing for setting the simultaneous transmission flag 53 in the cellular phone 38 as an example. First, the operator (caller) selects a memory dial editing function by using the data input unit 44 (step 501). The memory dial includes the phone number, the email address, the associated URL, and the simultaneous transmission flag 53 stored in the RAM 46. Next, the operator inputs the phone number by using the data input unit 44 (step 502). Then, the operator inputs the email address corresponding to the phone number (step 503). The phone number and the email address are stored in the phone number storing area 50 and the email address storing area 51, respectively. After the input operation, the operator determines whether or not the associated URL to be sent simultaneously with the phone call is inputted to the RAM 46 (step 504). If the operator determines that the associated URL is not inputted, the processing ends. If the operator determines that the associated URL is inputted, the associated URL is inputted (step 505). A plurality of URLs of the single phone number can be inputted. The inputted URLs are stored in the associated URL storing area 52. Subsequently, the operator determines whether or not the email is transmitted simultaneously with the phone call (step 506). The determination result in step 506 is stored in the simultaneous transmission flag 53. If the operator determines that the email is transmitted simultaneously with the phone call, it is checked to see if the associated URL is inputted in step 505 (step 507). This check operation prevents the formation of the email without the URL. After checking that the associated URL is inputted, the simultaneous transmission flag 53 is set to ON (step 508). The above-mentioned operation causes the completion of the input operation of the email address associated with the phone number, the associated URL, and the simultaneous transmission flag 53.

The control unit 42 executes main portions shown in FIGS. 4 to 6 by the program stored in the ROM 45 or therein.

Figure 7:
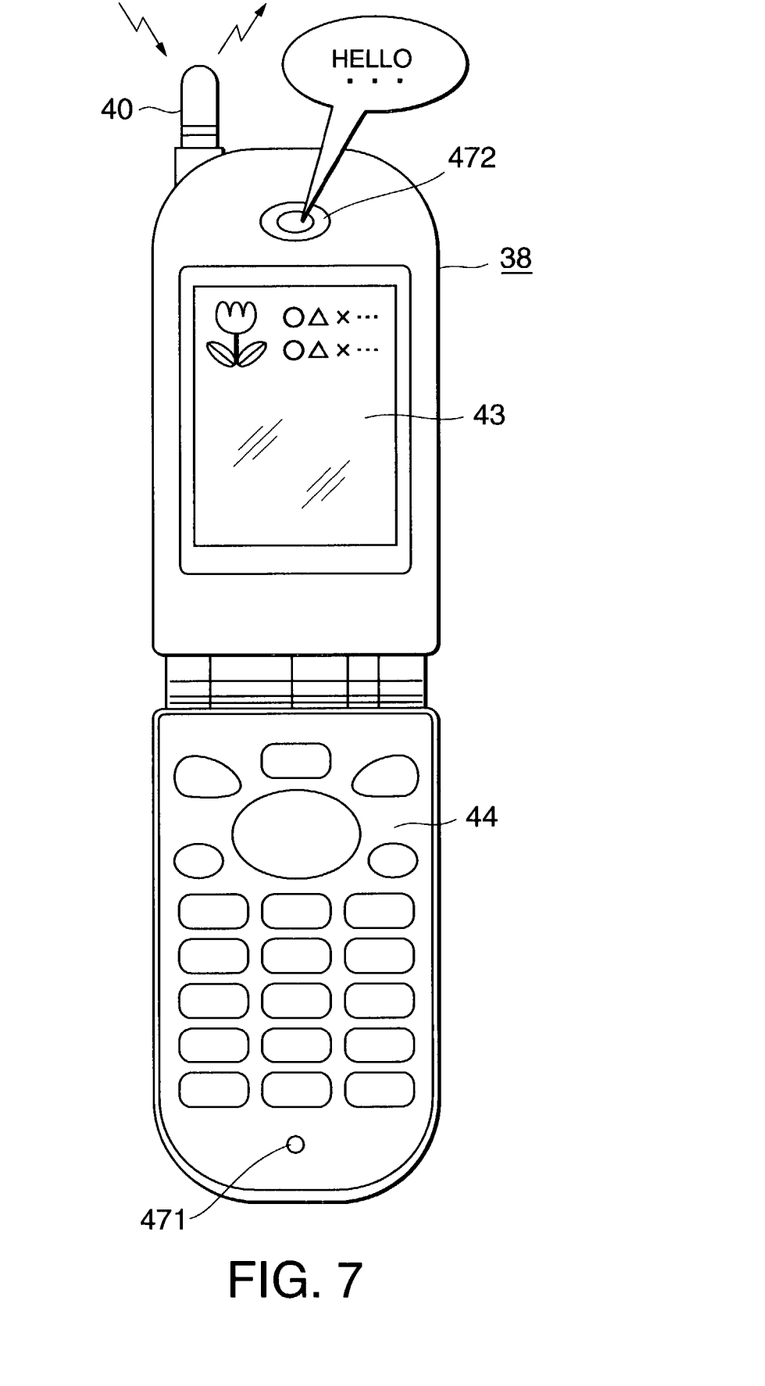
FIG. 7 is an external view showing a transceiver which is applied to a cellular phone according to a third embodiment of the present invention.

FIG. 7 is an external view showing a transceiver that is applied to a cellular phone according to other aspect of the present invention is applied. A display unit 43 shown in FIG. 7 displays an icon corresponding to the URL, in place thereof.

The transceiver according to the embodiments of the present invention stores the phone number, the email address, and the URL which are previously associated with each other, thereby automatically sending the email including the URL to the callee by the normal phone call operation. Thus, both the caller and callee can access the same homepage during communication.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A transceiver for enabling voice communication and network access, comprising:
   a transmitting and receiving unit;
   a data input unit;
   a display unit;
   a memory which stores a phone number, an email address, and a URL;
   a data transmitting unit which transmits a first voice signal to a device associated with the phone number in said memory via said transmitting and receiving unit, and which transmits the email to an email address corresponding to the phone number, said email including the URL associated with the phone number;
   a data receiving unit which receives a second voice signal; and
   a display control unit which displays the URL to said display unit.

2. A transceiver according to claim 1, wherein said memory stores a plurality of URLs associated with a phone number, and wherein said memory is configured to allow a caller to select at least one of the plurality of URLs.

3. A transceiver according to claim 1, further comprising an email forming unit which forms the email including the URL.

4. A transceiver according to claim 1, wherein said memory stores a flag indicating whether or not the email is sent to the email address when a caller sends the voice signal to the phone number.

5. A transceiver according to claim 1, further comprising a data input control unit which stores the phone number, the email address, and the URL which are inputted by said data input unit, which are associated with each other, in said memory.

6. A transceiver according to claim 1, wherein said display control unit can display an icon corresponding to the URL.

7. A transceiver according to claim 1, wherein said data transmitting unit, said data receiving unit, and said display control unit are formed in a CPU.

8. A transceiver according to claim 1, wherein said transceiver comprises a mobile terminal device.

9. A transceiver according to claim 1, wherein said transceiver comprises a personal computer.

10. A transceiver according to claim 1, wherein said transceiver comprises a cellular phone.

11. A transceiver for enabling voice communication and access to a network, comprising:
    a transmitting and receiving unit;
    a data input unit;
    a display unit;
    a memory which stores a phone number, an email address, and a URL;
    a data transmitting unit which transmits a first voice signal to a device associated with the phone number in said memory via said transmitting and receiving unit, and which transmits an email to the email address corresponding to the phone number, said email including the URL associated with the phone number;
    a data receiving unit which receives a second voice signal and which receives an email; and
    a display control unit which displays a URL included in the transmitted email or the received email on said display unit.

12. A transceiver according to claim 11, wherein said memory stores a plurality of URL associated with a phone number, and wherein said memory is configured to allow a caller to select at least one of the plurality of URLs.

13. A transceiver according to claim 11, further comprising an email forming unit which forms the email including the URL.

14. A transceiver according to claim 11, wherein said memory stores a flag indicating whether or not the email is sent to the email address when a caller sends the voice signal to the phone number.

15. A transceiver according to claim 11, further comprising a data input control unit which stores the phone number, the email address, and the URL which are inputted by said data input unit, and which are associated with each other.

16. A transceiver according to claim 11, wherein said display control unit is configured to display an icon corresponding to the URL.

17. A transceiver according to claim 11, wherein said data transmitting unit, said data receiving unit, and said display control unit are formed in a CPU.

18. A transceiver according to claim 11, wherein said transceiver comprises a mobile terminal device.

19. A transceiver according to claim 11, wherein said transceiver comprises a personal computer.

20. A transceiver according to claim 11, wherein said transceiver comprises a cellular phone.

* * * * *